Oct. 28, 1958     G. M. BUTLER, JR     2,858,403
SILICON CARBIDE IMMERSION HEATING DEVICE
Filed April 23, 1956     2 Sheets-Sheet 1
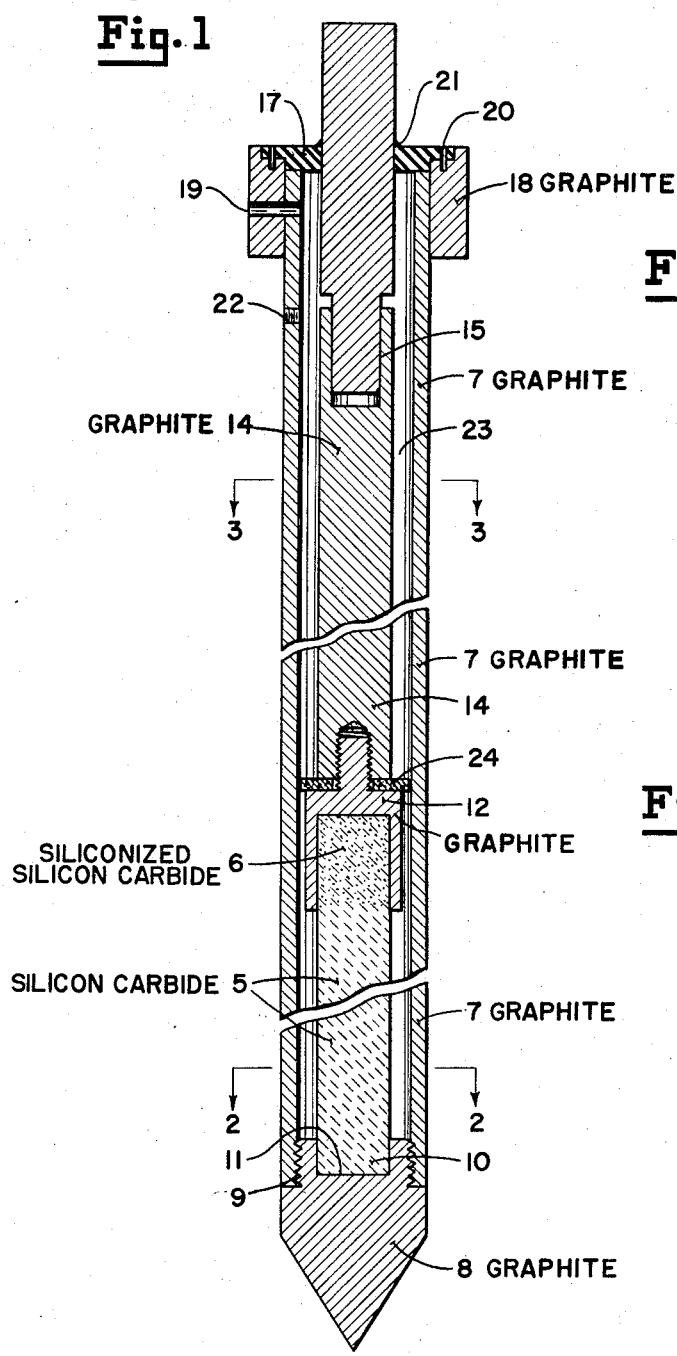
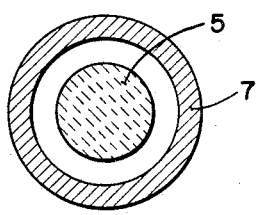
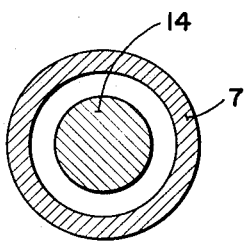
INVENTOR.
GURDON M. BUTLER, Jr.
BY
ATTORNEY

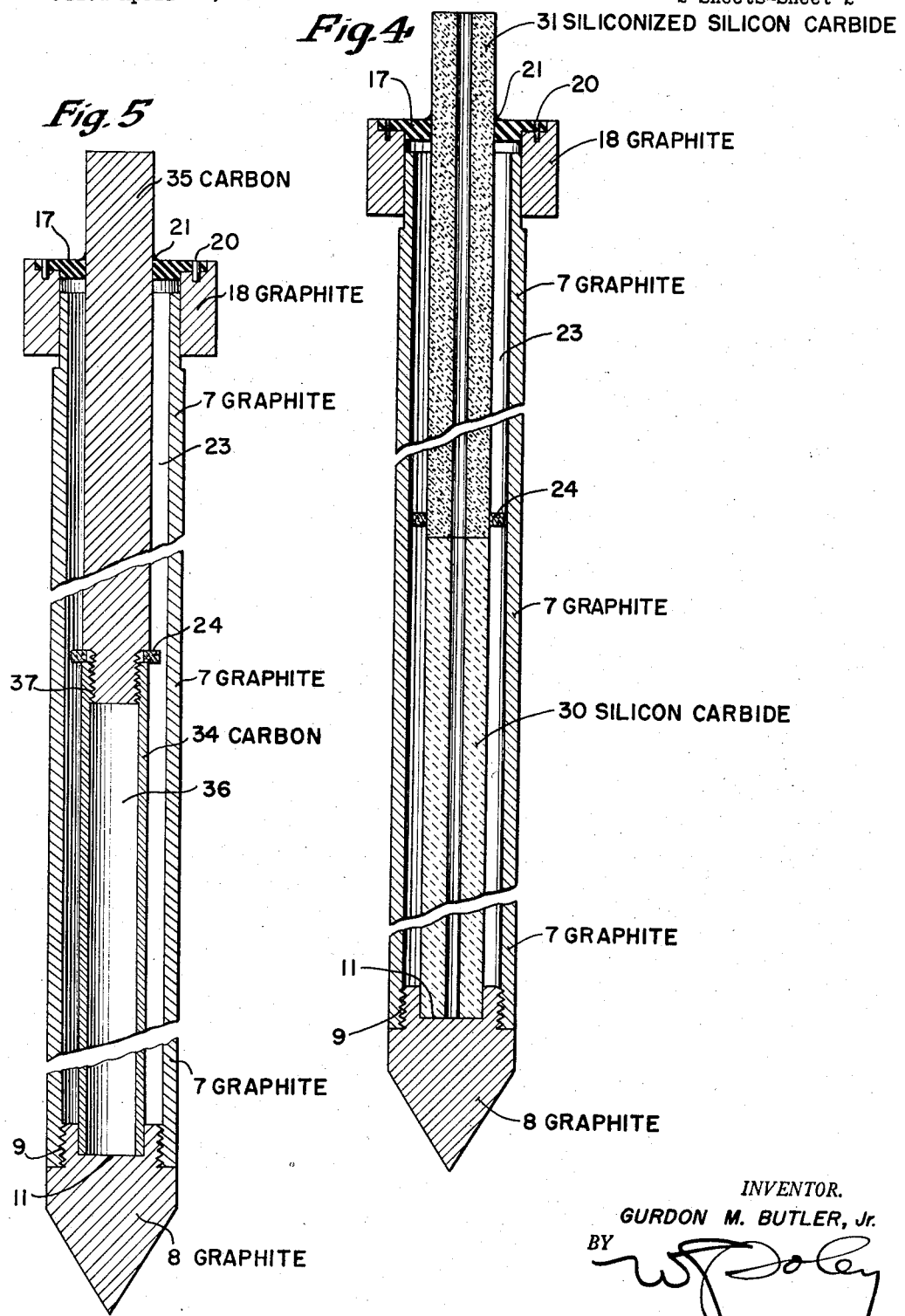

United States Patent Office 2,858,403
Patented Oct. 28, 1958

2,858,403

SILICON CARBIDE IMMERSION HEATING DEVICE

Gurdon M. Butler, Jr., Niagara Falls, N. Y., assignor to The Carborundum Company, Niagara Falls, N. Y., a corporation of Delaware Application April 23, 1956, Serial No. 579,843

9 Claims. (Cl. 201—75)

This invention relates to an immersion type heating device. More particularly, it pertains to a heating device of the described type in which a non-metallic, inorganic resistance body, and preferably a silicon carbide resistance body, serves as the heating element of the device.

Silicon carbide heating elements of the conventional type consisting of a rod of silicon carbide having the end portions impregnated to provide lower resistance terminals known as "cold ends" are well known. However, such elements are entirely unsuitable for use as immersion heating elements and furthermore are provided with no means of protection against ambient atmospheres of particularly corrosive character. Immersion heaters of the type available in the prior art, such as metal heating coils, are limited to use at relatively low temperatures and cannot be used in many types of corrosive materials or atmospheres which attack the metal of the heating unit.

It is an object of the present invention to provide an immersion heating device embodying a non-metallic heating element suitable for use at relatively high temperatures beyond those at which metallic heating units can be used.

It is a further object to provide a silicon carbide resistance heating device in which the heating element is protected or shielded from direct contact with surrounding gases or corrosive elements.

It is a further object to provide a silicon carbide heating device of a design adapted for use as an immersion heating unit in which the terminals of the device are conveniently located at one end of the heater.

Accordingly, an immersion type heating element is provided comprising an elongated rod or tube of non-metallic, inorganic resistance material, and preferably recrystallized silicon carbide, seated in a closed end carbon or graphite tube, the heating element being spaced from the surrounding carbon or graphite tube throughout the balance of its length. The inner end of the silicon carbide or other heating element is so seated in the closed end of the graphite or carbon tube as to be in electrically conductive contact with the carbon or graphite tube. The opposite or outer end of the heating element is cold-ended or, in other words, impregnated or treated or otherwise modified in composition or structure to give it a lower electrical resistance than the heating portion of the element, and either protrudes itself from the open end of the graphite tube or is electrically connected to a carbon or graphite extension member which in turn protrudes from the open end of the graphite tube. For example, the terminal portions of a silicon carbide heating element can be siliconized to render it of lower electrical resistance, or it can be welded to a terminal body of lower resistance material, or mechanically mounted to a terminus member. Where a carbonaceous heating element of graphite or carbon is used the terminal portion can be of sufficiently greater cross-section than the heating portion to lower its electrical resistance the necessary amount for it to be suitable for "cold-ending" purposes. A cross-section ratio of 1:4 of the heating portion to terminal portion has been found satisfactory. One specific way of providing a carbon or graphite heating element of lesser cross-section in the heating portion is to construct the heating portion of the element in the form of a thin walled tube with a solid rod terminal portion. Means are provided at or adjacent the open end of the graphite shielding tube to introduce a protective gas such as nitrogen under light pressure into the space between the heating element and the graphite tube during use or, in the case of a hollow tube-like heating element, into the interior of the silicon carbide heating element to form a protective atmosphere around the silicon carbide element. The open end of the graphite tube is provided with a closure cap constructed to provide means for insulating the heating element or the extension rod thereof from the shielding tube and also confine the protective atmosphere therein.

A better understanding of the invention may be had by referring to the appended drawings, in which:

Figure 1 is a longitudinal sectional view of a silicon carbide immersion type heating unit embodying the principles and features of the present invention;

Figure 2 is a horizontal sectional view through the line 2—2 of Figure 1;

Figure 3 is a horizontal sectional view through the line 3—3 of Figure 1;

Figure 4 is a longitudinal cross-section of a modified form of immersion heater embodying the principles and features of the present invention; and Figure 5 is a longitudinal cross-section of another modified form of immersion heater embodying principles and features of the present invention referred to hereinabove, and in which a carbon or graphite heating element comprises a carbon heating portion in the form of a thin-walled carbon tube 34 having an axial bore 36, and connected by threaded connection 37 to a solid carbon rod terminal member 35.

Referring to the specific embodiment of the invention shown in Figures 1, 2 and 3 of the drawing, the silicon carbide immersion heating unit illustrated comprises a solid, recrystallized silicon carbide rod 5 which is 1½" in diameter and 51" long, the upper 6" of the rod being preferably, although not necessarily, impregnated with silicon material to provide a cold end portion 6 having an electrical resistance substantially lower than the electrical resistance characteristics of the heating portion of the rod. The method of siliconizing recrystallized silicon carbide bodies need not be described here inasmuch as it is well known in the art. One method that can be used is that described in detail in Heyroth U. S. Patent No. 1,906,963. Instead of siliconizing the end of the recrystallized silicon carbide rod 5 with silicon to provide an end portion of lower electrical resistance than the heating portion of the rod, the heating unit 5 can be provided with an end portion of siliconized silicon carbide material, as for example, a body formed by siliconizing a porous body of carbon to form a mass of reticular silicon carbide crystals containing interstitial silicon material, as fully described in Heyroth U. S. Patent No. 2,431,326. Such siliconized silicon carbide bodies can be welded to the silicon carbide heating portion of the rod in accordance with the welding procedures disclosed in Heyroth U. S. Patent 2,319,323.

The silicon carbide heating element 5 is enclosed in a surrounding graphite shielding tube 7 which is closed at one end by the carbon or graphite plug 8 which is secured to the tube by being threadably engaged by the threads 9. One end 10 of the silicon carbide heating element is seated in the graphite plug 8 so as to provide satisfactory electrically conductive contact with the graphite plug and sleeve. One method of assuring adequate electrically sound conductive connection is to place a small amount of powdered silicon in the cavity 11 provided in the upper base of the graphite plug and with the lower end of the silicon carbide heating element seated therein the temperature is raised to a point e. g. around 1800–2100° C. where the silicon is vaporized and penetrates the silicon carbide body in the vicinity of the joint and forms a siliconized joint therewith.

The upper or siliconized end of the silicon carbide heating element is fitted with a graphite adapter 12 through which the heating element is connected to a graphite extension rod 14 of sufficient length to extend beyond the open end of the shielding tube 7. The extension rod 14 is composed of two pieces fitted together to provide a thermal expansion joint 15. In the specific device as illustrated the carbon or graphite shielding tube 7 is 3" outside diameter and around 115" long and has a $\frac{5}{16}$" wall thickness. The shielding tube is closed at the upper end by means of a closure cap comprising a cap plate 17 of "Transite" board or other suitable insulating material to electrically insulate the extension rod 14 from the shielding tube 7, and a graphite collar 18. ("Transite" is a registered trademark of the Johns-Manville Sales Corp. for a hard-pressed, heavy board material composed of asbestos and Portland cement.) The collar is secured against displacement on the tube 7 by means of one or more steel pins 19; the cap plate is secured to the collar by means of several studs 20. Cement 21 is usually placed around the cap to further effect a satisfactory seal at the open end of the tube. An opening 22 is provided adjacent the upper end of the shielding tube to provide means for introducing protective atmospheres into the annular space 23 between the silicon carbide heating element and extension post and the surrounding shielding tube during use of the heating unit. One or more ceramic spacers 24 are provided to further assure centering of the heating element within the tube throughout its length. The heating unit in use is connected to a source of electrical energy by terminal leads suitably connected to the graphite collar and the outer end of the graphite extension post which, if desired, can be metallized to provide better electrical contact.

According to the modification shown in Figure 4 the silicon carbide heating element, instead of being a solid rod, is in the form of a hollow tubular member 30 of recrystallized silicon carbide of sufficient length to extend beyond the open end of the surrounding graphite shielding tube 7. The heating portion is confined entirely within the shielding tube, the portion 31 of the heating element extending outside the graphite tube and for some distance into the tube being provided with a lower electrical resistance than the heating portion of the tube. The cold-end or outer terminal portion 31 of the heating element can be provided by either impregnating the outer end of a recrystallized silicon carbide tube with silicon or the heating element can be composed of a heating portion of recrystallized silicon carbide united by means of a siliconized weld to a terminal portion of suitable length composed of a siliconized silicon carbide body having a much lower electrical resistance than the heating portion of the heating element. In this modification provision for differential in thermal expansion between the graphite tube and the heating unit is made by the elimination of any pin such as pin 19 of Figure 1 so that collar 18 is free to move along tube 7 when the heating element expands or contracts in use. Space is provided between the top of tube 7 and cap 17 to allow for such movement. A protective atmosphere can be maintained around the heating element in use by connecting the outer siliconized end of the silicon carbide heating unit to a source of protective gas such as nitrogen or argon which is passed into the tube and forced through the pores of the tube walls under light pressure to maintain a protective atmosphere around the heating element.

While I have described one or two specific embodiments of the present invention it is not intended to be limited to the exact dimensional specifications set forth hereinabove or to be confined to the specifically mentioned materials other than as required by the appended claims. Also, while I have described my invention primarily in accordance with the preferred practice of using a recrystallized silicon carbide resistance body as the heating element, it is also applicable where the device is to be used under permissive conditions to use a heating element of other electrical resistance bodies of non-metallic character, such as carbon or graphite rods or tubes.

Having described the invention in detail it is intended to claim:

1. A silicon carbide resistance type immersion heating device comprising an elongated recrystallized silicon carbide heating element, a closed end carbon sheath surrounding said heating element and spaced therefrom over most of its length, one end of said silicon carbide heating element being in electrically conductive contact with the closed end of said carbon sheath, the opposite end of said heating element having a terminal portion of lower electrical resistance extending from said sheath, the protruding end of said heating element being electrically insulated from said sheath.

2. A silicon carbide resistance type immersion heating device comprising an elongated recrystallized silicon carbide heating element, the closed end carbon sheath surrounding said heating element in spaced relationship thereto, one end of said silicon carbide heating element being conductively connected to the closed end of said carbon sheath, the opposite end of said heating element having a terminal portion of lower electrical resistance protruding from said sheath, the protruding end of said heating element being electrically insulated from said sheath.

3. A silicon carbide resistance type immersion heating device comprising a recrystallized silicon carbide rod siliconized at one end, a tubular carbon sheath having an inside diameter greater than the outside diameter of the silicon carbide rod and closed at one end enclosing said rod with the siliconized end of the silicon carbide rod protruding from the open end of the sheath and the opposite end of said rod being conductively connected to the closed end of said sheath, the rod being substantially centered within the sheath and electrically insulated therefrom at the open end by means closing said tube.

4. A silicon carbide resistance type immersion heating device comprising a hollow recrystallized silicon carbide tube siliconized at one end, a tubular carbon sheath having an inside diameter greater than the outside diameter of the silicon carbide tube and closed at one end enclosing said tube with the siliconized end of the silicon carbide tube protruding from the open end of the sheath and the opposite end of said tube being conductively connected to the closed end of said sheath, the tube being substantially centered within the sheath and electrically insulated therefrom at the open end by means closing said tube.

5. A silicon carbide resistance type immersion heating device comprising a recrystallized silicon carbide rod siliconized at one end, a tubular carbon sheath having an inside diameter greater than the outside diameter of the silicon carbide rod and closed at one end enclosing said rod with the siliconized end of the silicon carbide rod protruding from the open end of the sheath and the opposite end of said rod being conductively connected to the closed end of said sheath, the rod being substantially centered within the sheath and electrically insulated therefrom at the open end by means closing said tube and means for passing protective gas into said sheath.

6. A silicon carbide resistance type immersion heating device comprising a recrystallized silicon carbide rod siliconized at one end, a tubular carbon sheath having an inside diameter greater than the outside diameter of the silicon carbide rod and closed at one end enclosing said rod, the unsiliconized end of said silicon carbide rod being conductively connected to the closed end of said sheath, a carbon rod conductively connected to the siliconized end of said silicon carbide rod and extending outwardly beyond the open end of the carbon sheath, the silicon carbide rod and carbon rod being substantially centered within the sheath and electrically insulated therefrom, and an insulation cap closing the open end of said carbon sheath.

7. A resistance type immersion heating device comprising an elongated non-metallic, inorganic resistance heating element, a closed end carbon sheath surrounding said heating element and spaced therefrom over most of its length, one end of said heating element being in electrically conductive contact with the closed end of said carbon sheath, the opposite end of said heating element having a terminal portion of lower electrical resistance extending from said sheath, the protruding end of said heating element being electrically insulated from said sheath.

8. A resistance type immersion heating device according to claim 7 in which the heating element comprises an elongated carbon element having a terminal portion of lower electrical resistance than that of the heating portion thereof.

9. A resistance type immersion heating device comprising an elongated non-metallic, inorganic resistance heating element, a closed end carbon sheath surrounding said heating element and spaced therefrom over most of its length, one end of said heating element being in electrically conductive contact with the closed end of said carbon sheath, the opposite end of said heating element having a terminal member of lower electrical resistance extending from said sheath, the protruding end of said heating element being electrically insulated from said sheath.

References Cited in the file of this patent

UNITED STATES PATENTS

| | | |
|---|---|---|
| 1,644,911 | Braun | Oct. 11, 1927 |
| 1,829,950 | Voigtlander | Nov. 3, 1931 |
| 2,305,577 | Stoelting | Dec. 15, 1942 |
| 2,735,881 | Mann | Feb. 21, 1956 |